United States Patent [19]

Inou et al.

[11] Patent Number: 5,659,461
[45] Date of Patent: Aug. 19, 1997

[54] SWITCHING POWER SUPPLY USING PRINTED COIL TYPE TRANSFORMER

[75] Inventors: Kiyoharu Inou; Yuichi Suzuki; Hisanaga Takano; Kiyoshi Yokoshima, all of Tokyo, Japan

[73] Assignee: Yokogawa Electric Corporation, Tokyo, Japan

[21] Appl. No.: 492,176

[22] Filed: Jun. 19, 1995

[30] Foreign Application Priority Data

Jun. 30, 1994 [JP] Japan ................................. 6-149078
Jul. 27, 1994 [JP] Japan ................................. 6-175123

[51] Int. Cl.$^6$ ................................................. H02M 3/335
[52] U.S. Cl. ........................... 363/21; 336/184; 336/234; 363/141; 363/97; 363/131
[58] Field of Search ............................ 363/21, 80, 141, 363/147, 144; 336/123, 170, 184, 224, 232, 234

[56] References Cited

U.S. PATENT DOCUMENTS

| | | | |
|---|---|---|---|
| 3,777,296 | 12/1973 | Ohyama et al. | 336/120 |
| 4,622,627 | 11/1986 | Rodriguez et al. | 363/37 |
| 5,313,381 | 5/1994 | Balakrishnan | 363/147 |
| 5,355,301 | 10/1994 | Saito et al. | 363/147 |
| 5,521,573 | 5/1996 | Inoh et al. | 336/180 |

*Primary Examiner*—Peter S. Wong
*Assistant Examiner*—Shawn Riley
*Attorney, Agent, or Firm*—Moonray Kojima

[57] ABSTRACT

An indirect feedback type flyback converter that compares favorably with the direct feedback type flyback converter in controllability of secondary output voltage, wherein the converter is arranged so that a switching signal, which is induced in a secondary winding when a direct current input voltage, applied to a primary winding, is turned ON and OFF by a switching element, is smoothed by rectification and fed to a load and that an output voltage is detected using a switching signal induced in an auxiliary winding to transmit a control signal to the switching element for the purpose of stabilizing the output voltage; wherein the primary, secondary and auxiliary windings are formed on respective coil formation surfaces of a coil laminate as convoluted shaped conductor patterns disposed between a core hole at the center of the pattern and the border of the coil formation surface, with the auxiliary winding being disposed to be near the border of the coil formation surface.

11 Claims, 10 Drawing Sheets

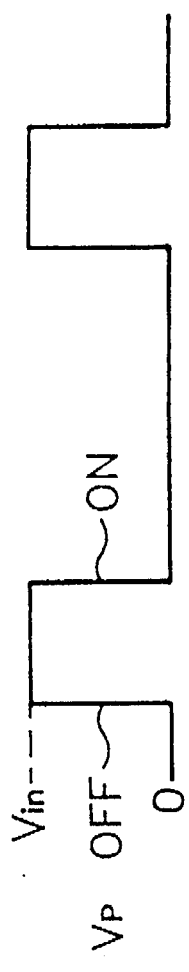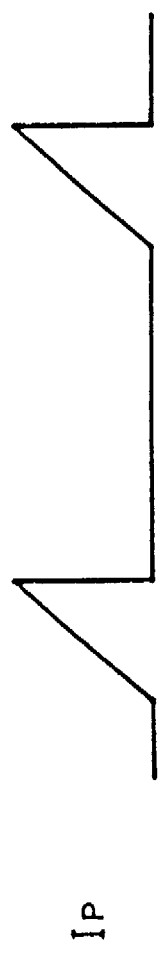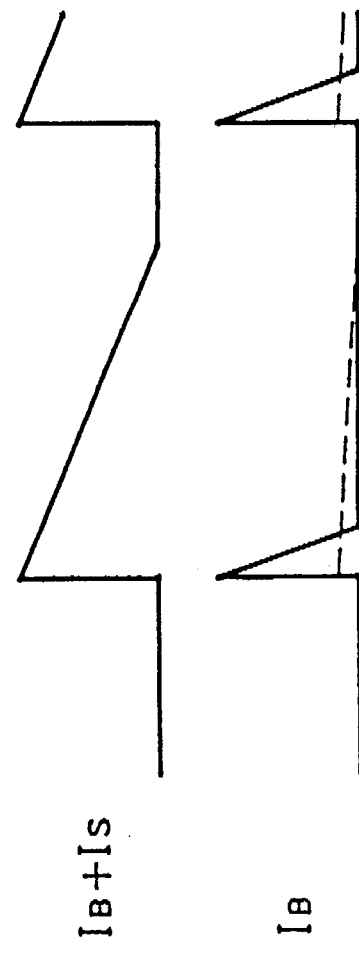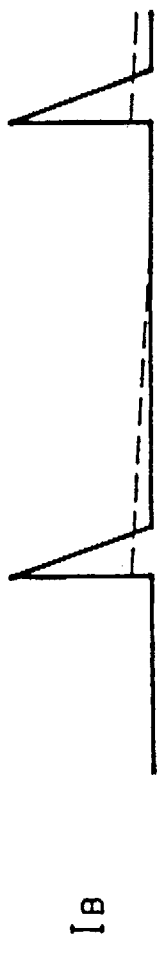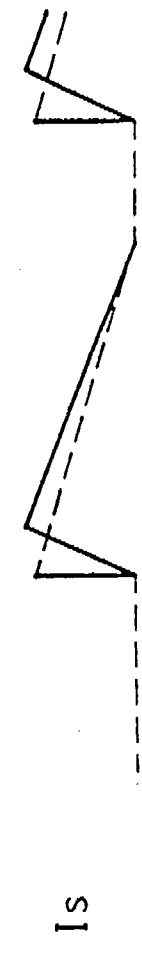
Fig. 2(A) PRIOR ART
Fig. 2(B) PRIOR ART
Fig. 2(C) PRIOR ART
Fig. 2(D) PRIOR ART
Fig. 2(E) PRIOR ART

SWITCHING POWER SUPPLY USING PRINTED COIL TYPE TRANSFORMER

BACKGROUND OF THE INVENTION

1. Field of Invention

This invention relates to switching power supply using a printed coil type transformer; and more particularly, to improvements in the "indirect feedback" type stabilized power supply and in an arrangement for dissipating heat therefrom.

2. Description of the Prior Art

A direct feedback type stabilized power supply, such as disclosed in Japanese Unexamined Application 1989/278, 259, is operated by detecting a secondary output voltage and by feeding back the secondary output voltage to a primary control circuit. In such a power supply, a photocoupler or pulse transformer is used to isolate the output voltage.

FIG. 1 shows a conventional direct feedback type stabilized power-supply, wherein a DC input voltage Vin is turned ON and OFF by a switching element Q and then applied to a primary winding Np. The noise of the peak characteristic caused by the switching is absorbed by an input capacitor Cin disposed in the input circuit of the primary winding Np. A current flowing through the primary winding Np is represented by Ip, and a voltage generated across the primary winding Np is represented by Vp. A switching current Is is induced in a secondary winding Ns and is converted by a rectifier smoothing circuit into a direct current to supply an output voltage Vout to load $R_L$. The rectifier smoothing circuit consists of diode D1 and capacitor C1. A switching current $I_B$ is also induced concurrently in an auxiliary winding $N_B$ and is converted by another rectifier smoothing circuit into a direct current to provide operating power to a PWM control circuit. The other rectifier smoothing circuit consists of a diode D2 and a capacitor C2. A photocoupler PC feeds back a signal, which contains the output voltage Vout, to the PWM control circuit and isolates the primary circuit from the secondary circuit. The PWM control circuit transmits an ON/OFF control signal to switching element Q to keep constant the output voltage Vout.

FIGS. 2(A)–2(E) illustrate the operation of the device of FIG. 1, wherein FIG. 2(A) shows the primary winding voltage Vp; FIG. 2(B) shows the primary winding current Ip; FIG. 2(C) shows the sum of the secondary winding current Is and the auxiliary winding current $I_B$; FIG. 2(D) shows the auxiliary winding current $I_B$; and FIG. 2(E) shows the secondary winding current Is. In FIGS. 2(D) and 2(E), the broken line and the solid line correspond to the direct feedback type stabilized power supply and the indirect feedback type stabilized power supply, respectively. When switching element Q is turned OFF, the primary winding voltage Vp is equalized to the DC input voltage Vin, and the primary winding current Ip increases in a triangular waveform manner. When switching element Q is turned ON, the primary winding voltage Vp and the primary winding current Ip are nullified so that the energy stored in the primary winding is transmitted to the secondary winding. Thus, the secondary winding current Is is similar in waveform to the auxiliary winding current $I_B$ and is gradually reduced when switching element while the switching element Q is turned OFF. Since the auxiliary winding has a lower impedance than the impedance of the secondary winding, the energy stored in the transformer when the switching element Q is turned OFF is supplied first to the auxiliary winding and then to the secondary winding.

When the secondary winding output voltage Vout is controlled using the auxiliary winding voltage $V_B$, the auxiliary winding voltage rises more sharply than the secondary winding voltage. This is because the winding voltage V is expressed as a product of an inductance L multiplied by a rate of change of the current I, that is as follows:

$$V = L(dI/dt) \qquad (1)$$

Because of the differences in rising characteristics, the indirect feedback type flyback converter is less accurate in controlling the secondary winding output voltage than the direct feedback type flyback converter. The indirect feedback type flyback converter uses the auxiliary winding output voltage $V_B$ to control the secondary winding output voltage Vout, as discussed.

As disclosed in Japanese Unexamined Utility Model Application 1992/8,390, the indirect feedback type flyback converter has a large capacity and that heat produced therein is dissipated through a radiator or a box using radiation plates. In a switching power supply having a large capacity, e.g. of about 100 Watts, heat generated by the electronic parts, such as the transistors and diodes used for switching, is dissipated by conduction, and heat generated Q is turned OFF. The foregoing type of switching power supply is referred to as a flyback converter.

The direct feedback type stabilized power supply utilizes a secondary system for the transfer function and has a problem in that the control system thereof is difficult to design. An indirect feedback type stabilized power supply, such as disclosed in the Japanese Unexamined Patent Application 1985/98,870, provides a solution to the control system design problem. FIG. 3 shows a conventional indirect feedback type stabilized power supply, wherein the parts performing the same functions as in FIG. 1 are denoted by like characters and are not discussed hereat further for sake of clarity. In the conventional indirect feedback type stabilized power supply, an auxiliary winding $N_B$ is substituted for the photocoupler PC to provide a channel through which the output voltage Vout is fed back to the PWM control circuit.

The operation of the FIG. 3 device is described with reference to FIGS. 2(A)–2(E). Although in FIGS. 2(A)–2(E) the waveform showing the sum of the secondary winding current Is and the auxiliary winding current $I_B$ is the same as in the case of the direct feedback type stabilized power supply, the auxiliary winding current $I_B$ is represented by a triangular waveform which rises at the beginning of the period during which switching element Q is turned OFF and the falls sharply. On the other hand, secondary winding current Is has a waveform which increases with decreasing auxiliary winding current $I_B$, the reaches a maximum at the instant the auxiliary winding current $I_B$ is nullified, and then, gradually falls by the transformers is dissipated by convection because of the size of the size of the transformers.

FIG. 4 shows a conventional mounted switching power supply, wherein heat dissipation channels are indicated by the arrows. In FIG. 4, a mounting base 40 formed in the shape of a flat plate from an insulating material, such as epoxy resin, is provided with a wiring pattern 42 formed from a conductive material such as copper on one side of the base 40 or on both sides thereof. An electronic part 50, such as a power diode or power transistor, is mounted on base 40. The electronic part 50 generates heat. A heat sink 60 is mounted on base 40 and is in thermal contact with electronic part 50 so that heat sink 60 dissipates the heat from the electronic part 50. A transformer 13 which comprises various windings is mounted on base 40. The transformer 13 has a core 131 disposed in the center hole of bobbin 132, around which winding 133 is wound. Winding 133 is connected to a terminal 134 which is soldered to a through hole in base 40.

FIG. 5 is a circuit diagram of the device of FIG. 4 and shows the heat dissipation channels with arrows. In FIG. 5 a DC voltage is applied from an input supply Vin via an input capacitor Cin to the primary winding n1 of the transformer 13. When a switching transistor Tr, which is connected to primary winding n1, is turned ON and OFF, a current flowing through the primary winding n1 causes a switching signal to be induced in a secondary winding n2 of the transformer 13. The switching signal from the secondary winding is rectified by a diode D and smoothed by a capacitor Cout and then supplied as an output voltage Vout to a load $R_L$. A control signal supplied to the transistor Tr may be of an indirect feedback or of an indirect feedback. An auxiliary winding may be provided close to the primary winding n1 or the secondary winding n2 of the transformer 13.

FIG. 13 is an equivalent circuit diagram of the heat dissipation channels of a conventional device, such as shown in FIG. 4. The circuit comprises a switching transistor $Q_{TR}$, a transformer $Q_T$, and a diode $Q_D$. These elements generate heat and are substantially separate from each other. The windings 133 of the transformer T generate heat. The heat is dissipated in two ways: first, by convection from the transformer surfaces, and second, by conduction through terminal 134. Because of high thermal resistance, the amount of heat dissipated by conduction is negligible as compared with the heat dissipated by convection. The thermal resistance is high because of the insulation and air contained between the windings and the terminal 134. Moreover, terminal 134 is of tin plated iron and hence has high thermal resistance. When core 43 meets the requirements of the Japanese Industrial Standard (JIS) EER25.5, the thermal resistance thereof is about 70° C./W.

On the other hand, when transformer T is cooled by convection only, the volume thereof must be increased by a factor of 2.8 times if heat loss is doubled (see Page 280 of "Thermal Designs of Electrical Devices"). Accordingly, transformer size is increased with increased power consumption.

Also, when heat is dissipated by convection, thermal resistance varies with the placement of the parts surrounding the transformer. That is to say, the thermal resistance of a section exposed to effective air flow is reduced. On the other hand, the thermal resistance of a section cut off from the effective air flow is increased. The self cooling of a transformer by convection varies widely with the positioning of the parts thereof. Thus, power supply design and thermal design cannot be separated from each other, and the interdependence thereof makes design of such power supplies both complex and difficult.

SUMMARY OF THE INVENTION

Accordingly, an object of the invention is to overcome the aforementioned and other problems, disadvantages and deficiencies of the prior art.

Another object is to provide an indirect feedback converter that compares favorably with the direct feedback flyback converter in controlling the secondary output voltage.

A further object is to provide a mounting arranged for a printed coil transformer with high self cooling properties and which mounting can be thermally designed without regard to the location of the parts thereof.

The foregoing and other objects, features and advantages are attained by the invention which encompasses a flyback converter arranged so that a first switching signal, which is induced in a secondary winding when a direct current input voltage, applied to a primary winding is turned ON and OFF by a switching element, is smoothed by rectification and fed to a load, and so that an output voltage is detected using a second switching signal induced in an auxiliary winding to transmit a control signal to the switching element for the purpose of stabilizing the output voltage. In the embodiment, the primary winding, the secondary winding and the auxiliary winding are formed on respective coil formation surfaces of a flat multi-layered coil laminate by conductor patterns which are substantially uniformly disposed between a core hole at the center of the patterns and a border of the coil formation surface; and with the auxiliary winding being nearer to the outer periphery of the coil formation surface than the core hole. The conductor patterns are convoluted in shape.

Since the auxiliary windings are not provided near the core hole, where the magnetic linkage is higher than at the border of the coil formation surface, the auxiliary winding has a loose electromagnetic linkage with the core. Thus, the impedance of the auxiliary winding circuit becomes as high as the impedance of the secondary winding circuit, so that even an indirect feedback type output voltage stabilized circuit provides the flyback converter with a high degree of control.

Moreover, the invention further encompasses a transformer wherein switching signals, which are induced in the secondary winding when the direct current input voltage applied to the primary winding is turned ON and OFF by the switching element, are smoothed by rectification and fed to the load; and wherein, the transformer comprises an insulating resin used to laminate inner layer patterns, each of which is assigned to the primary and secondary windings; a coil laminate having pin terminals made of a copper based material, which are connected to both ends of the primary and secondary windings; a heat sink, which is grounded to the AC ground of the switching power supply and attached to the switching element and a secondary winding circuit rectifier; and a wiring pattern, through which heat is transferred from the pin terminals to the heat sink, is provided on a mounting base on which the power supply is mounted.

The transformer comprises a coil laminate and an insulating resin which insulates the primary and secondary windings so that the size thereof is smaller than conventional transformers using air insulation. The heat sink which is thermally connected to the printed coil transformer of the invention using pin terminals and wiring pattern, causes the heat resistance to be reduced. Thus, heat dissipation by conduction is dominant. Accordingly, the placement of the different parts has less effect on heat dissipation than when heat dissipation by convection is dominant.

BRIEF DESCRIPTION OF THE DRAWINGS

FIGS. 2(A)–2(E) are waveform charts depicting the operation of the device of FIG. 1.

DETAILED DESCRIPTION OF THE PREFERRED EMBODIMENTS

First and Second Embodiments

Figure 1:
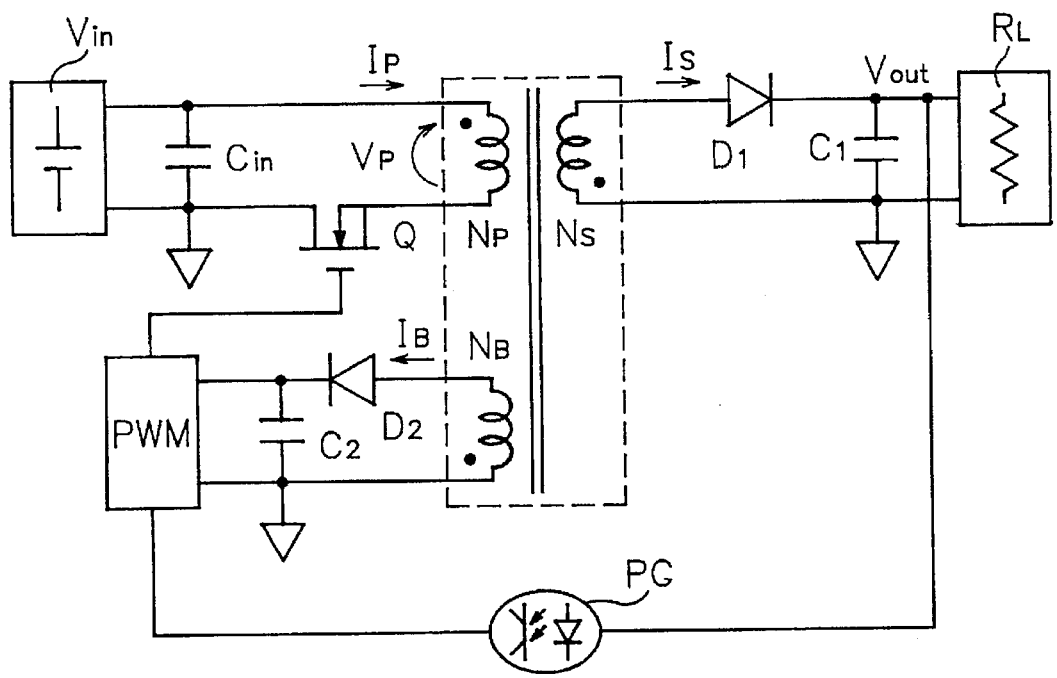
FIG. 1 is a circuit diagram depicting a conventional direct feedback type stabilized power supply.
Figure 3:
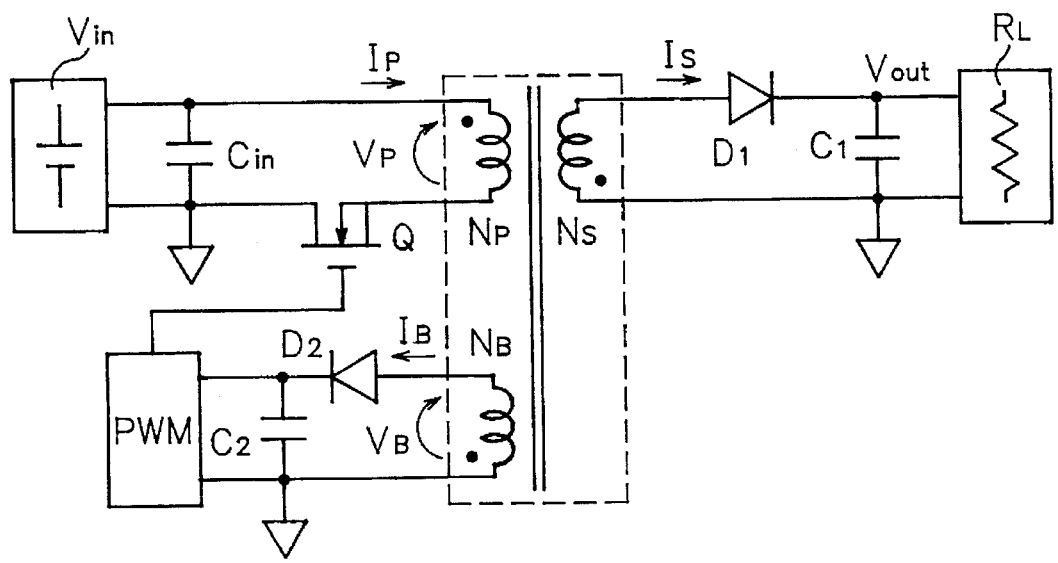
FIG. 3 is a circuit diagram depicting a conventional indirect feedback type stabilized power supply.
Figure 7:
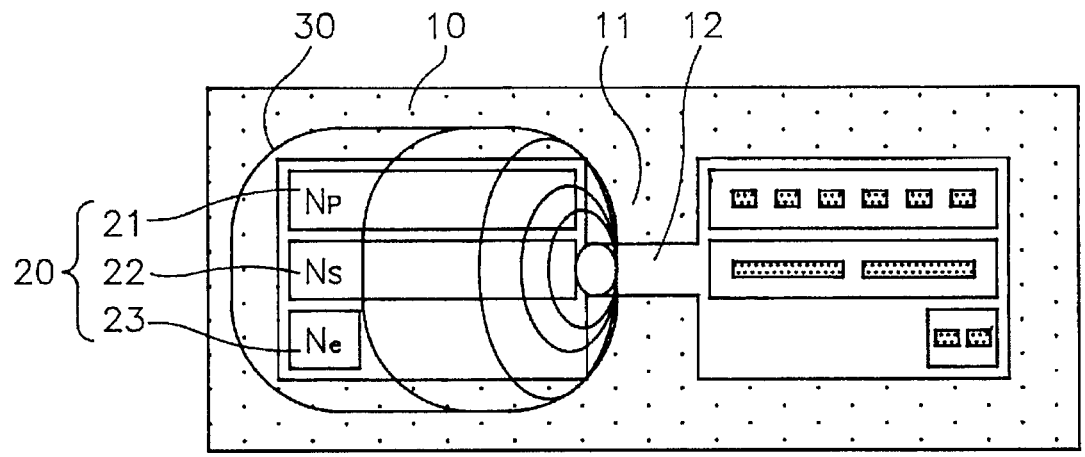
FIG. 7 is a cross sectional view depicting a transformer of a first illustrative embodiment of the invention.

FIG. 7 shows a first embodiment of a transformer comprising a core 10, of an EE type, with a center core 11 at a middle portion. thereof. A center gap 12 is provided opposite center core 11 and acts to reduce the leakage inductance. A coil laminate 20, which may be of an integrated structure, comprises a conventional bobbin and wire, such as disclosed in Japanese Patent Application 1994/128,531, and is also referred to as a printed coil transformer. Coil laminate 20 comprises a flat multi-layered structure, e.g. in this case, a three layered structure comprising an upper layer, an intermediate layer, and a lower layer. The upper layer may comprise a primary winding flat coil section 21, a secondary winding flat coil section 22, and an auxiliary winding flat coil section 23. As with the case of FIG. 3, the functions of the primary winding flat coil section 21, secondary winding flat coil section 22, and auxiliary winding flat coil section 23, are denoted by the characters Np, Ns, and $N_B$, respectively. The lines of magnetic flux 30 are represented by a plurality of closed loops centered about center gap 12 with interlinking magnetic flux density being high near the center core 11 and low away from the center core 11.

Figure 8:
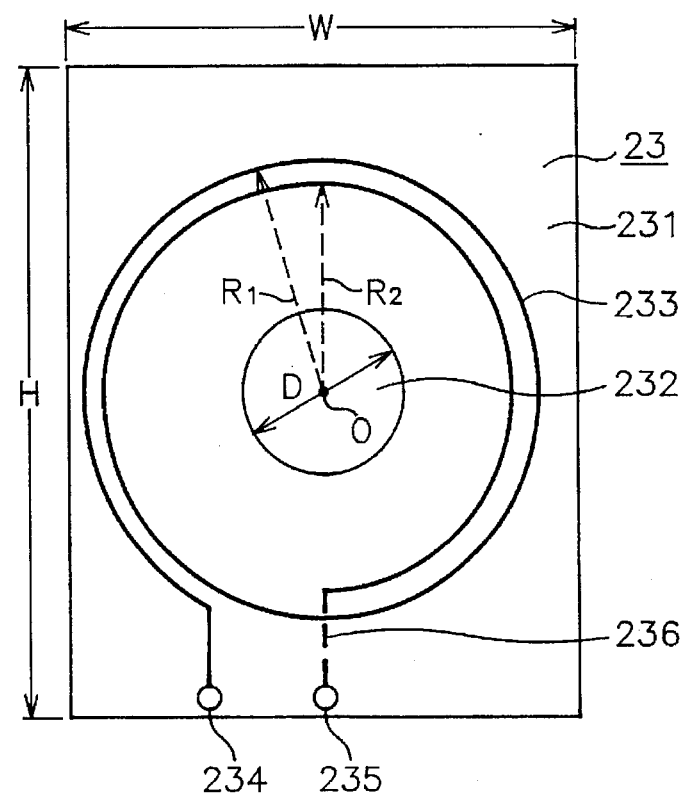
FIG. 8 is a top view depicting an auxiliary winding flat coil section of the embodiment of FIG. 7.

FIG. 8 shows details of an auxiliary winding flat coil section 23, wherein a coil formation surface 231 is of a rectangular shape of width W and height H. The diameter of core hole 323, formed at the center of the coil formation surface 231, is larger than the outer diameter of the center core 11. A conductor pattern 233 is formed in a convoluted shape with core hole 232 disposed at the center thereof and with two turns being wound at the outer periphery or border of the coil formation surface rather than near core hole 232. Provided that the center of curvature of the turns corresponds to the center of core hole 232, the relationship between the radius of curvature of the outer turn, the radius of curvature of the inner turn, and the intermediate point between the edge surface of the coil formation surface 231 and core hole 232 (W+D)/4 is expressed as follows:

$$D/2 < (W+D)/4 \leq R2 < R1 < W/2 \qquad (2)$$

wherein R1 is the radius of curvature of the outer turn, and R2 is the radius of curvature of the inner turn.

An auxiliary winding terminal 234 is connected to one end of conductor pattern 233 which is formed on coil formation surface 231. An auxiliary winding terminal 235 is connected to the other end of the conductor pattern 233 via a connection pattern 236. Since the connection pattern 236 must intersect the conductor pattern 233 without short circuiting, the connection pattern is formed on another coil formation surface or formed on coil formation surface 231 with an insulation disposed between the two patterns.

The primary winding flat coil section 21 and the secondary winding flat coil section 22 (see FIG. 7), whose top views are not shown, have formed in the surfaces thereof conductor patterns which are of convoluted shapes and have substantially uniform spacings between the core hole and the border of the coil formation surface. As shown more clearly at the right side of FIG. 7, the primary winding flat coil section 21 and secondary winding flat coil section 22 have six turns and two turns, respectively. The turns ratio is set so as to correspond to a desired ratio of the input voltage Vin to the output voltage Vout.

The operation of the FIG. 7 embodiment is as follows. Since the core gap is formed as the center gap 12 in the power supply transformer for the flyback converter, the interlinking magnetic flux density increases toward the center core 11. The electromagnetic connection between the conductor pattern 233 and the core thus becomes closer to core hole 232. In auxiliary winding flat coil section 23, conductor 233 is placed at the border of the coil formation surface 231. Thus, the interlinking magnetic flux density is lower at the border than when the conductor pattern 233 is disposed near the core hole 232. The impedance of the auxiliary winding circuit increases and approaches the impedance of the secondary winding circuit. Thus, the waveforms of the secondary winding current Is and the auxiliary winding current $I_B$ become similar to each other and controllability over the secondary winding output voltage is considerably increased over that attainable with the conventional devices.

The effect produced by placing the auxiliary winding flat coil section 23 close to the secondary winding flat coil section 22 is as follows. The interlinking magnetic flux with a coil causes the energy stored in the coil 10 to be transferred to the coil when the switching element Q is turned OFF. When the auxiliary winding flat coil section 23 is located away from the secondary winding flat coil section 22, magnetic flux interlinking the auxiliary winding only is generated. This prevents the secondary winding output from being reflected in the auxiliary winding output, which would lead to reduced indirect controllability. On the other hand, when auxiliary winding flat coil section 23 and secondary winding flat coil section 22 are disposed close to each other, the indirect controllability property is considerably enhanced because of the small amount of magnetic flux interlinkage with the auxiliary winding only.

Figure 9:
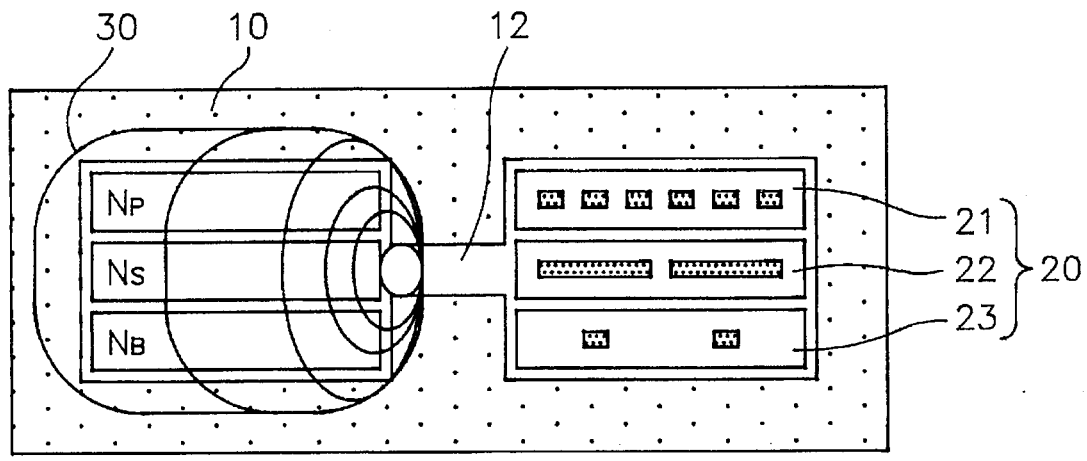
FIG. 9 is a cross sectional view depicting a transformer used for comparison with the invention.
Figure 10:
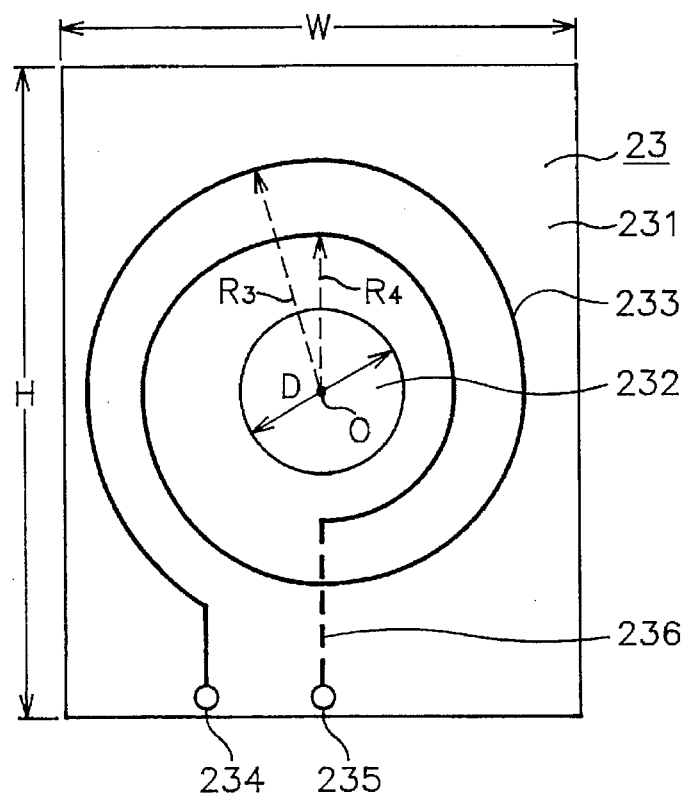
FIG. 10 is a top view depicting an auxiliary winding flat coil section of the embodiment of FIG. 9.

The embodiment of FIG. 7 may be compared with a transformer using an auxiliary winding flat coil section, wherein the conductor patterns are uniformly disposed on the coil formation surface 231, such as shown in FIGS. 9 and 10. In FIGS. 9 and 10, the conductor pattern 233 has a convoluted shape with a core hole 232 provided at the center of the conductor pattern 233 and with two turns being wound thereat so that the conductor pattern 233 is uniformly distributed between the vicinity of the core hole 232 and the outer periphery or border of the conductor pattern 233. Provided that the center of curvature of the turns corresponding to the center "0" of the core hole 232, the relationship between the radius of curvature of the outer turn and the radius of curvature of the inner turn is expressed as follows:

$$D/2 < R4 \leq (W+D)/4 < R3 < W/2 \qquad (3)$$

wherein R3 is the radius of curvature of the outer turn, and R4 is the radius of curvature of the inner turn.

Figure 11:
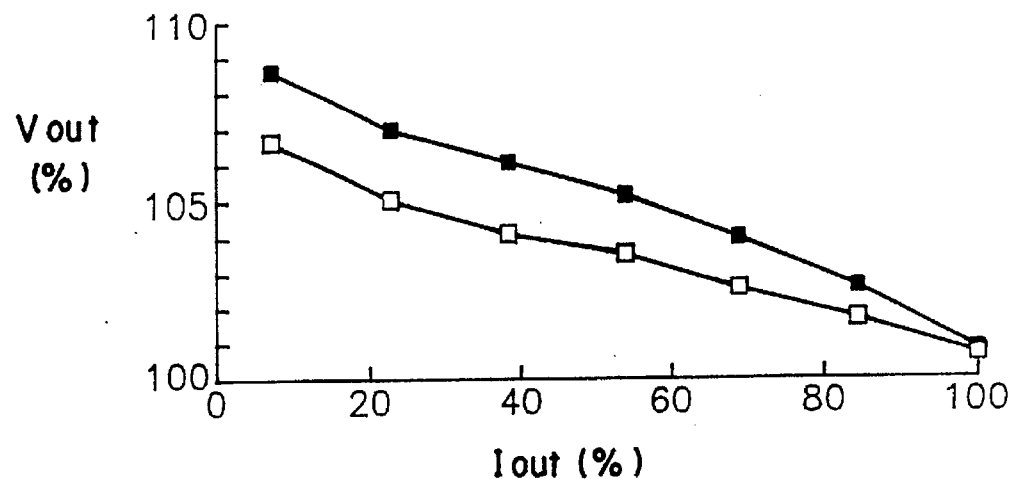
FIG. 11 is a graph depicting the relationship between the load current and the output voltage.

FIG. 11 shows the load regulation characteristics by observing the relationship between the load current Iout and the output current Vout, wherein the closed squares ■ indicate data obtained from the embodiment of FIG. 7 and wherein the open squares □ indicate data obtained from the comparison example of FIG. 9. Adjustments are made so that the output voltage Vout takes its rated value when the load current Iout is 100% of its rated value. If the load current Iout is less than its rated value, that is, the load is relatively light, the output voltage Vout is increased beyond its rated value. The difference between the output voltage Vout and its rated value is 30% smaller for the embodiment of FIG. 7 than for the comparison example of FIG. 9. When the load current Iout is 20% of its rated value, the output voltage Vout is 107% of its rated value for the comparison example while it is 105% of its rated value for the embodiment of FIG. 7.

Figure 12:
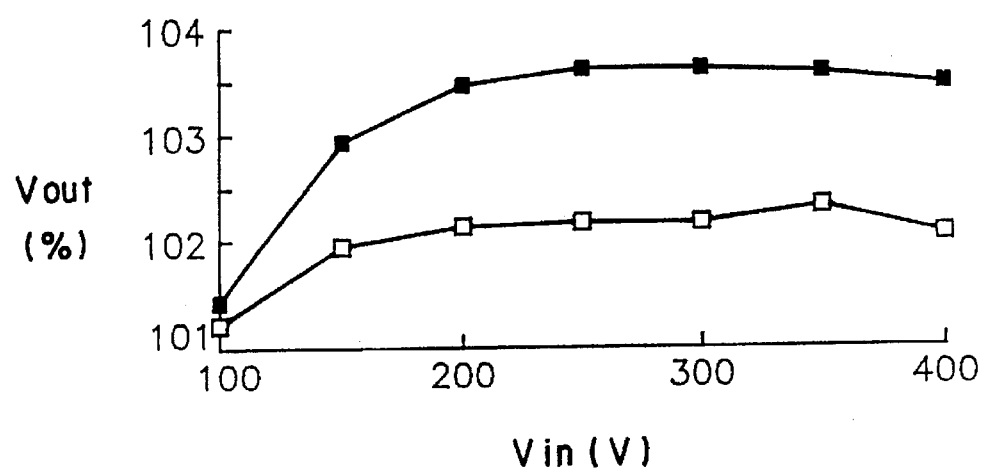
FIG. 12 is a graph depicting the relationship between the input voltage and the output voltage.

FIG. 12 shows the line regulation characteristics by observing the relationship between the input voltage Vin and the output voltage Vout, wherein the closed squares ■ indicate data obtained from the embodiment of FIG. 7, and wherein the open squares □ indicate data obtained from the comparison example of FIG. 9. Adjustments are made so that the output voltage Vout is about 101% when the input voltage Vin is 100% of its rated value. If the input voltage Vin is higher than its rated value, the output voltage Vout is increased beyond its rated value. The difference between the output voltage Vout and its rated value is 50% smaller for the embodiment of FIG. 7 than for the comparison example of FIG. 9. For example, when the input voltage Vin is 300 Volts, the output voltage Vout is 103.5% of its rated value for the comparison example of FIG. 9, while it is 102.0% of its rated value for the embodiment of FIG. 7.

Figure 13:
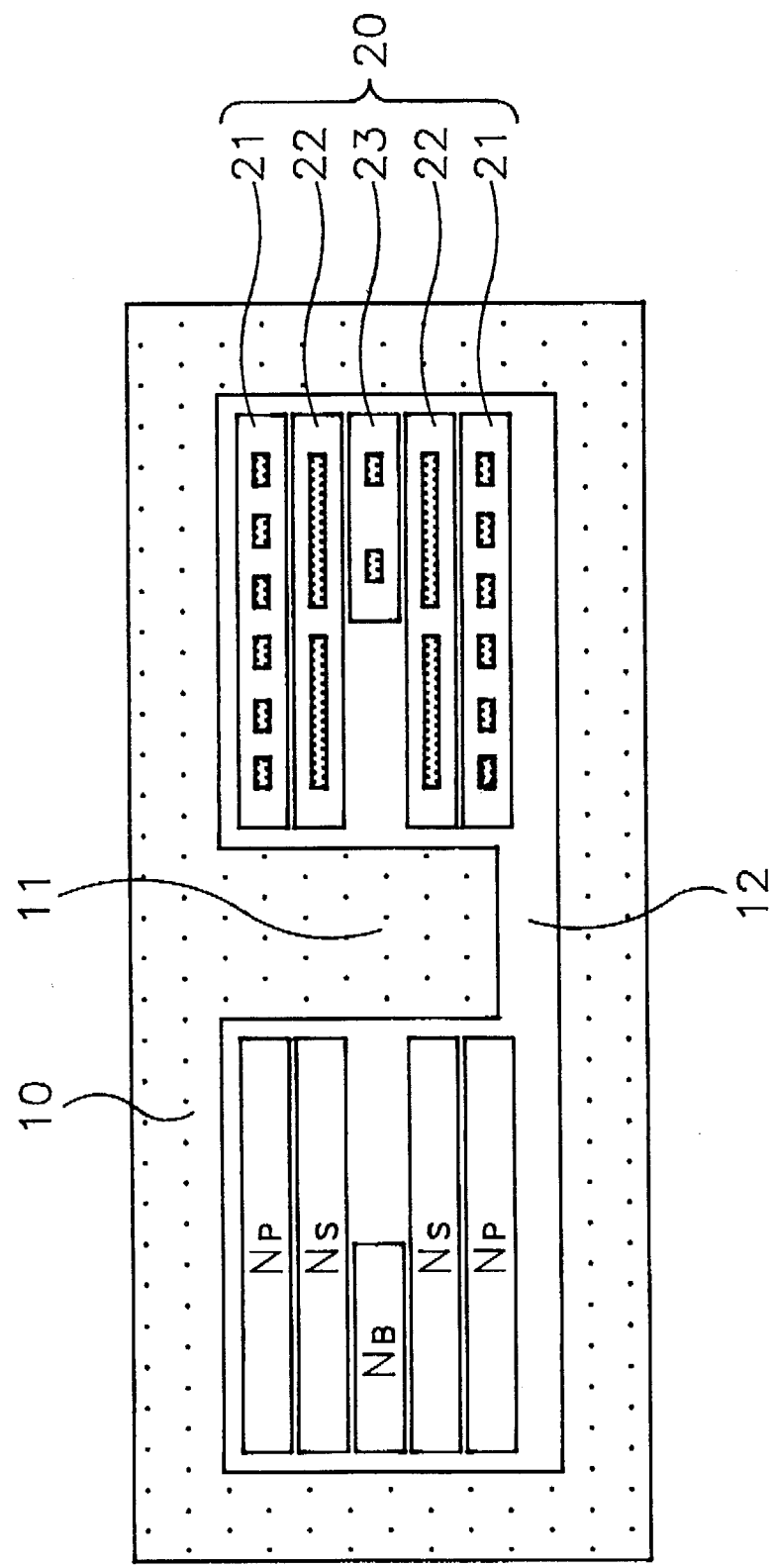
FIG. 13 is a cross sectional view depicting a transformer of a second illustrative embodiment of the invention.

FIG. 13 shows a second illustrative embodiment of a transformer comprising an EI type core 10. Center gap 12 is disposed below the center core 11. In the embodiment, a coil laminate 20 comprises a five layered structure with an auxiliary winding flat coil section being incorporated in a third layer, and a secondary winding flat coil section 22 being provided in the second and fourth layers, which are disposed to be on either side of the third layer, and a primary winding flat coil section 21 being disposed in the first and fifth layers which are the outermost layers. In this manner, the transformer has a highly symmetrical layered structure. If two secondary winding flat coil sections are provided in two layers, treating each of the two layers as a separate secondary winding allows the transformer to be used as a two output power supply. Moreover, the two secondary winding flat coil sections can be connected either in series or in parallel and be used as one output winding.

According to the first and second embodiments, the conductor pattern serving as the auxiliary winding is provided only in the border area away from the core hole, and the interlinking magnetic flux is lower at the border area than near the core. Hence, electromagnetic connection between the auxiliary winding and the core is loose. As a result, the impedance of the auxiliary winding circuit is increased to the extent of the impedance of the secondary winding circuit, so that even an indirect feedback type output voltage stabilizing circuit enhances the controllability of the flyback converter.

Third, Fourth and Fifth Embodiments

Figure 4:
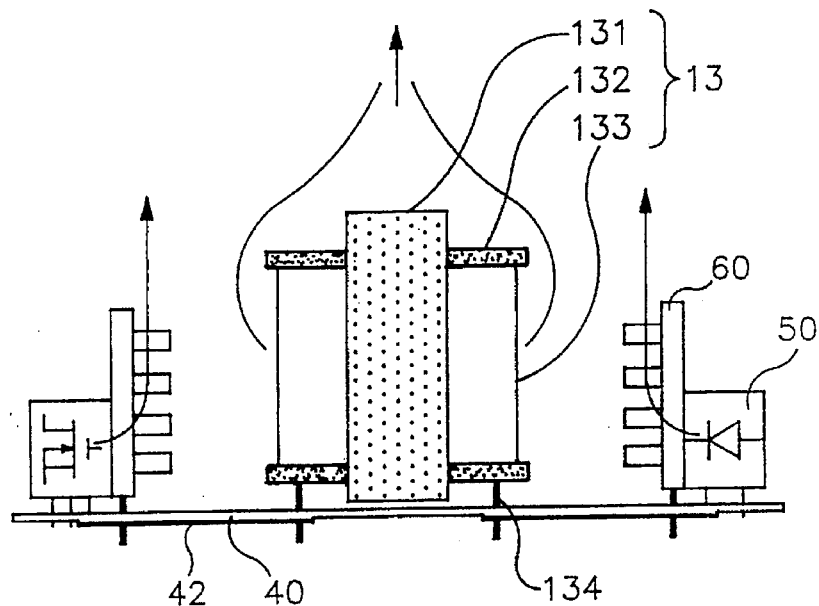
FIG. 4 is a side elevation view depicting a mounted conventional switching power supply.
Figure 14:
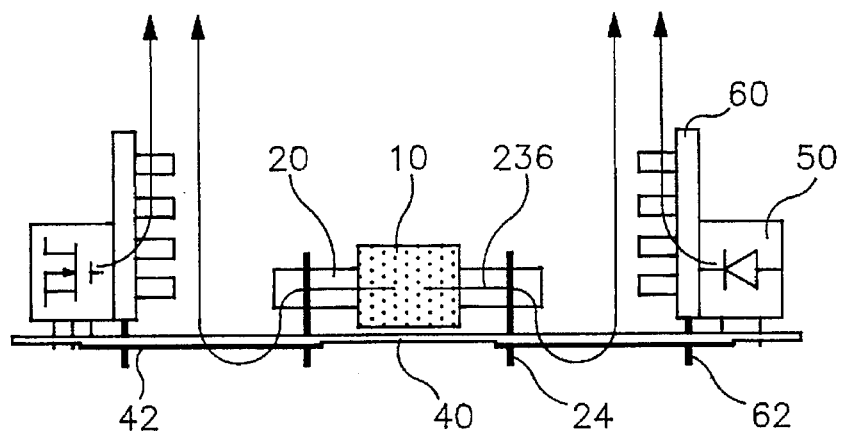
FIG. 14 is a side elevational view depicting a mounted switching power supply of a third illustrative embodiment of the invention.

FIG. 14 shows a mounted switching power supply of the third illustrative embodiment, wherein the parts performing the same functions as in FIG. 4 are denoted by the same characters and are not discussed hereat for sake of clarity. A coil laminate 20, which may be a combination of a bobbin and a conductor wire, is substantially the same as the coil laminate of FIG. 7. A core 10 is fitted into the center of the coil laminate, and the inner layer patterns 236 are laminated using an insulating resin. With core 10 at the center, the thickness of the solid insulation ensures that the primary winding and the secondary winding are radially and axially insulated. The dielectric strength of the solid insulation, e.g. 10 kV/mm, is about 10 times that of air, i.e. 1 kV/mm. Thus, the thickness of the insulating layer according to the invention is advantageously reduced to be ¹⁄₁₀ that of the conventional air insulating layer. Each layer pattern 236 is assigned to the primary winding and the secondary winding, and an auxiliary winding is added to the primary winding and the secondary winding, if needed.

A pin terminal 24 is connected to both ends of the primary winding and the secondary winding and is made of a copper based material to reduce electric resistance. Since pin terminal 24 is arranged so that a winding is not connected thereto, a low flexural rigidity material may be used therefor. The thermal conductivity of copper based material is more than 10 times that of conventional tin plated iron wire. Heat generated by the transformer windings is conducted via pin terminal 24 to the wiring pattern 42 without interrruption. Wiring pattern 42 is formed on mounting base 40 and is made of a copper based material to reduce its electric resistance. A fixing terminal 62 is connected to wiring pattern 42 and secures heat sink 60 to the mounting base 40.

Figure 5:
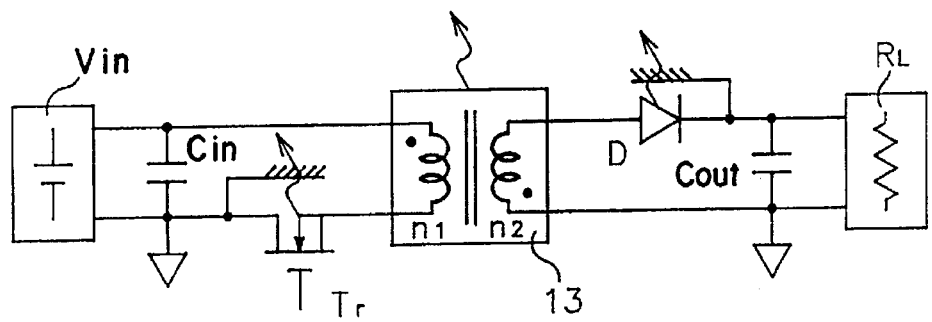
FIG. 5 is a circuit diagram depicting the device of FIG. 4.
Figure 6:
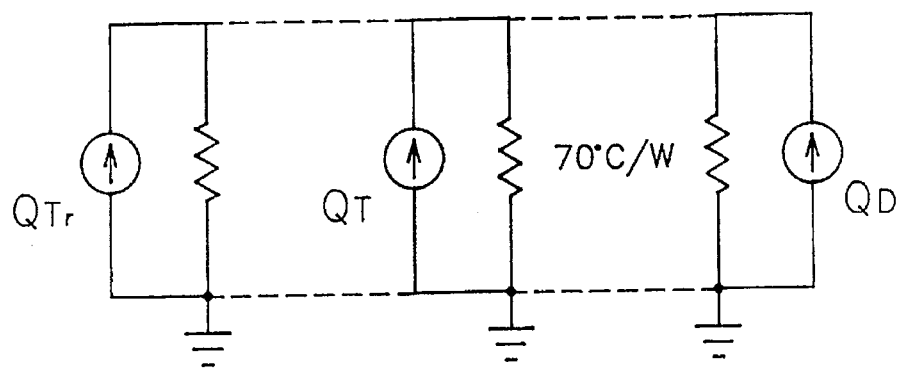
FIG. 6 is an equivalent circuit diagram depicting heat dissipation channels of a conventional device.
Figure 15:
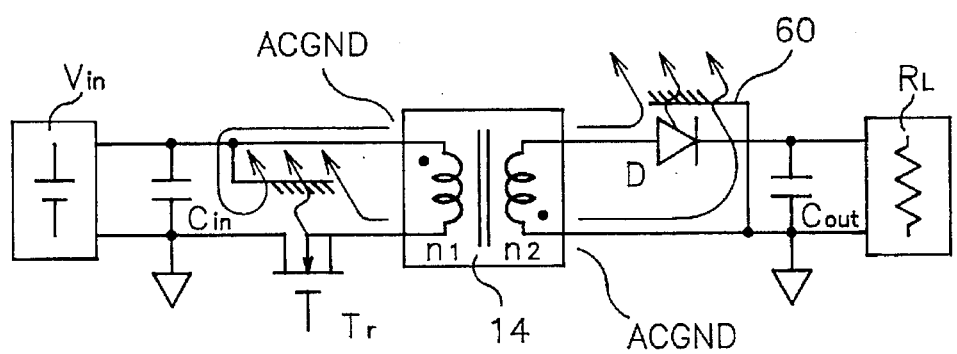
FIG. 15 is a top view depicting an auxiliary winding flat coil section of the embodiment of FIG. 14.

FIG. 15 shows the embodiment of FIG. 14 wherein the parts performing the same functions as those in FIG. 5 are labeled with the same characters and further disccusion thereof is omitted hereat for sake of clarity. The AC ground of the primary winding and of the secondary winding of the transformer 14 is denoted by closed circles ●. Heat sink 60 is connected to the AC ground so that noise due to the floating capacity between the heat sink 60 and the surrounding parts is reduced.

Figure 16:
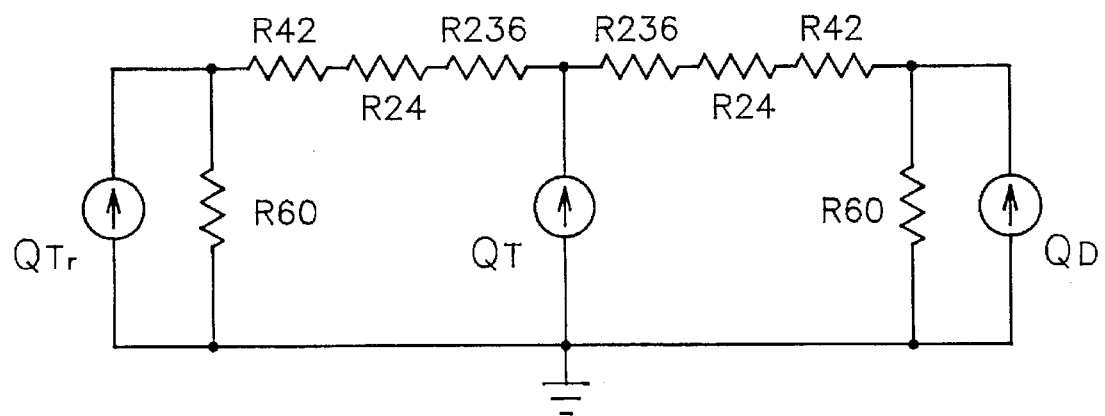
FIG. 16 is an equivalent circuit diagram depicting the heat dissipation channels of the embodiment of FIG. 14.

FIG. 16 shows the circuit equivalent of the heat dissipation channels of the embodiment of FIG. 14. The printed coil transfomer of the invention is extensively reduced in size as compared with the conventional transformers so that in the invention cooling by convection is reduced. However, advantageously, conduction cooling is substantially improved. In considering heat conduction, as shown in FIG. 16, there are thermal resistance R236 between the winding heating section and the pin terminal 24, thermal resistance R24 between the pin terminal 24 and the wiring pattern 42, thermal resistance R42 between the wiring pattern 42 and the fixing terminal 62, and thermal resistance R60 of the heat sink 60. Thermal resistance R236 is about 10° C.//W. Since the thermal resistance is about 10° C./W for a terminal which is 1.0 mm in diameter and 5 mm long, the thermal resistance R24 is sufficiently low for the five pin terminals 24 and being about 2° C./W. Thus, the sum of the thermal resistance R236 and the thermal resistance R24 between the winding heating section and the winding pattern 42 can be set at about 6° C./W. This value is about 1/10 that of the corresponding thermal resistance of a conventional device. On the other hand, the thermal resistance R42 and the thermal resistance R60 can be suitably reduced depending on the design so that good cooling by conduction is produced.

Figure 17:
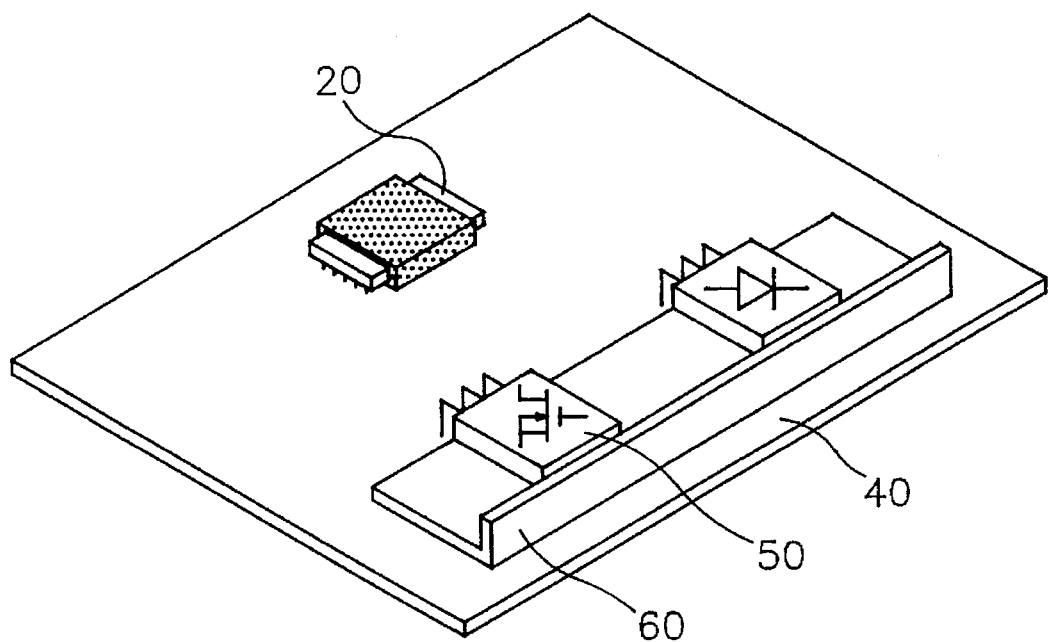
FIG. 17 is a perspective view depicting a fourth illustrative embodiment of the invention.
Figure 18:
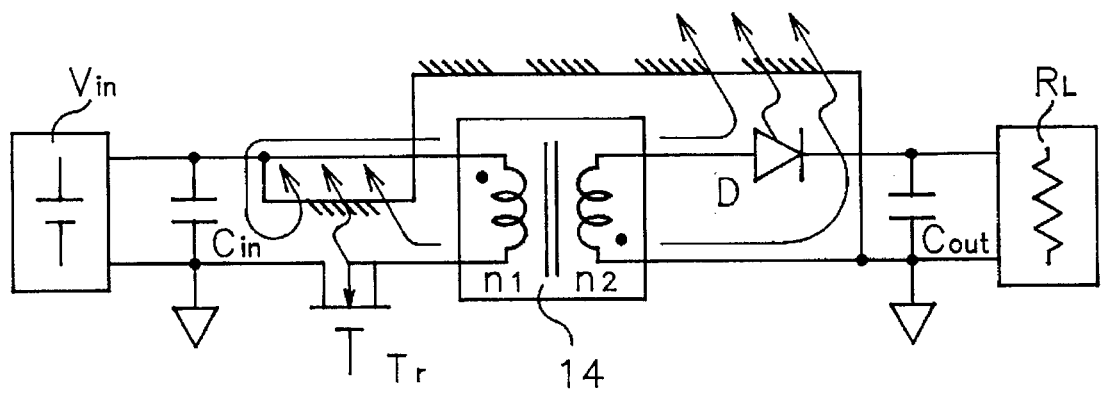
FIG. 18 is a circuit diagram depicting the embodiment of FIG. 17.

FIG. 17 shows a fourth illustrative embodiment with FIG. 18 being a circuit diagram thereof. A heat sink 60 is shared between the primary winding circuit and the secondary winding circuit of the switching power supply. The heat dissipation efficiency may be increased when a separate heat sink 60 is used for each of the primary winding circuit and the secondary winding circuit.

Figure 19:
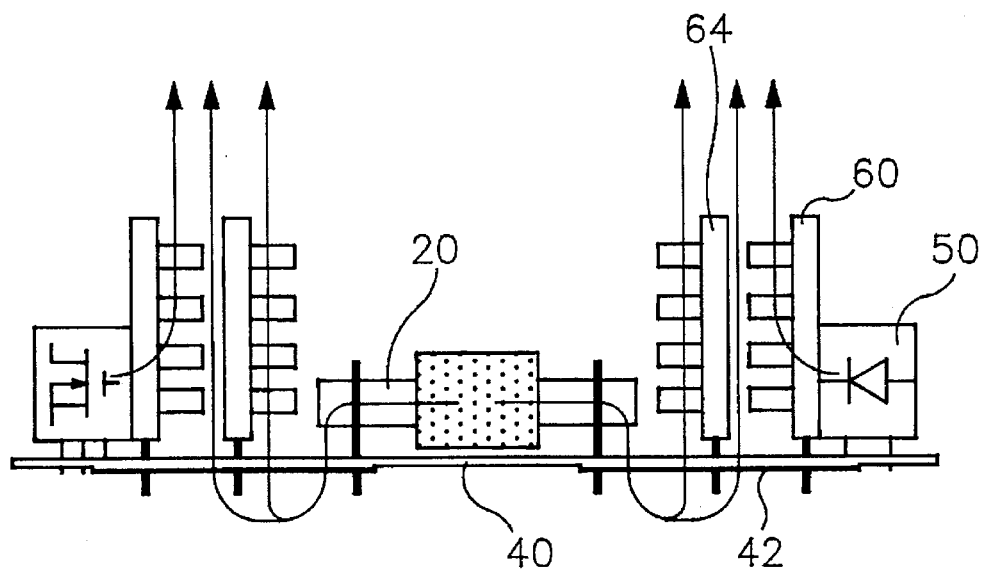
FIG. 19 is a side elevational view depicting a fifth illustrative embodiment of the invention.
Figure 20:
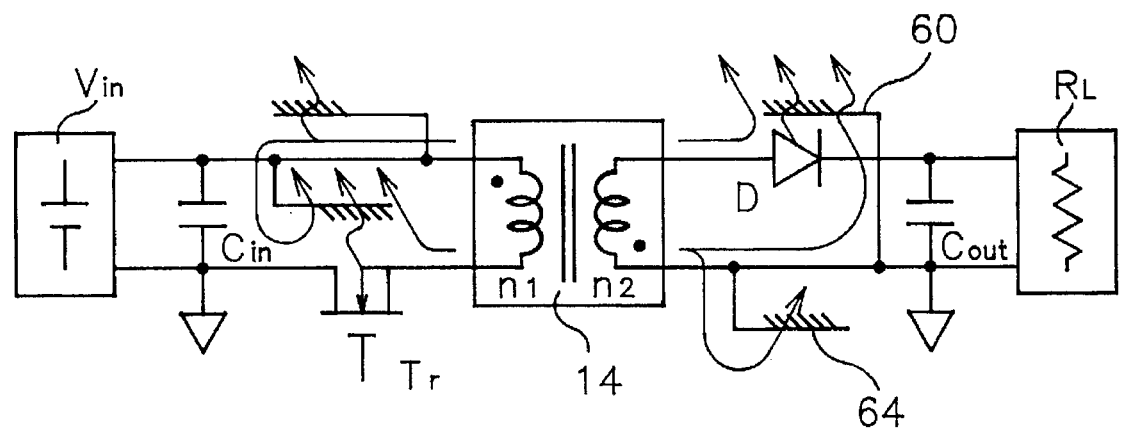
FIG. 20 is a circuit diagram depicting the embodiment of FIG. 19.

FIG. 19 shows a fifth illustrative embodiment and FIG. 20 shows the circuit diagram thereof. Since using only one heat sink 60 for cooling electronic part 50 may not be sufficient for various purposes, an additional heat sinke 64 may be provided. The additional heat sink 64 assists in dissipating heat from the transformer and is thermally connected to the wiring pattern 42. The wiring pattern 42 is used as an AC ground.

According to the third, fourth and fifth illustrative embodiments of the invention, heat dissipation resistance between the windings and the pin terminal 24 is advantageously reduced. Using the printed coil transformer of the invention, heat generated by the primary winding and the secondary winding is readily dissipated. Cooling by conduction is substantially improved even though heat dissipation by convention is reduced due to a smaller transformer structure. Thus, the total combined cooling effect obtained by the invention is a substantial improvement over conventional devices. Moreover, since the transformer heat is substantially cooled by conduction, thermal design is not greatly constrained by the location of the parts.

The foregoing description is illustrative of the principles of the invention. Numerous extensions and modifications thereof would be apparent to the worker skilled in the art. All such extensions and modifications are to be considered to be within the spirit and scope of the invention.

What is claimed is:

1. In a flyback converter using a printed coil type transformer, wherein said flyback converter is arranged so that a switching signal, which is induced in a secondary winding when a direct current input voltage, applied to a primary winding, is turned ON and OFF by a switching element, is smoothed by rectification and fed to a load, and so that an output voltage is detected using a switching signal induced in an auxiliary winding to transmit a control signal to said switching element for the purpose of stabilizing said output voltage; the improvement comprising said primary winding, secondary winding, and auxiliary winding being formed on respective coil formation surfaces of a flat multi-layered coil laminate as conductor patterns between a core hole and a border of said coil formation surface with said core hole being at a center of said conductor patterns; and wherein said auxiliary winding is formed on said coil formation surface nearer to said border than to said core hole; and wherein said transformer comprises a core type having a center gap disposed in said core hole.

2. The converter of claim 1, wherein said flat multi-layered coil laminate comprises a primary winding flat coil section on which said primary winding is formed, a secondary winding flat coil section on which said secondary winding is formed, and an auxiliary winding flat coil section on which said auxiliary winding is formed; and wherein said primary winding flat coil section, said secondary winding flat coil section and said auxiliary winding flat coil section are laminated together in that order.

3. In a flyback converter using a printed coil type transformer, wherein said converter is arranged so that a switching signal, which is induced in a secondary winding when a direct current input voltage, applied to a primary winding, is turned ON and OFF by a switching element, is smoothed by rectification and fed to a load and so that an output voltage is detected using a switching signal induced in an auxiliary winding to transmit a control signal to the switching element for the purpose of stabilizing the output voltage; the improvement comprising a magnetic core having a center gap disposed in a core hole; and wherein said primary winding, said secondary winding, and said auxiliary winding are formed on respective coil formation surfaces of a flat multi-layered coil laminate as conductor patterns positioned between said core hole and a border of said coil formation surface, with said auxiliary winding being formed in an area which is not of high magnetic flux density.

4. In a flyback converter using a printed coil type transformer for a switching power supply, wherein said printed coil type transformer smoothes a switching signal induced in a secondary winding when a direct current input voltage applied to a primary winding is turned ON and OFF by a switching element and feeding said switching signal to a load; the improvement comprising a flat multi-layered coil laminate having a plurality of pin terminals of a copper based material and connected to ends of said primary winding and said secondary winding, and wherein inner layer patterns laminated with an insulating resin are respectively assigned to said primary and secondary windings; heat sink means are provided grounded to AC ground of said switching power supply and attached to said switching element and a secondary side rectifier circuit; and wherein a winding pattern transfers heat from said plurality of pin terminals to said heat sink means.

5. The converter of claim 4, wherein said heat sink means is disposed to be shared by said switching element and said secondary side rectifier circuit.

6. The converter of claim 4, wherein said heat sink means comprises a pair of heat sinks.

7. In a flyback converter using a printed coil type transformer comprising a primary winding, a secondary winding, and an auxiliary winding, wherein said flyback converter is arranged so that a direct current input voltage applied to said input winding is turned ON and OFF by a switching element, thereby to induce in said secondary winding a first switching signal, and in said auxiliary winding a second switching signal, said first switching signal being smoothed by rectification and fed to a load, and said second switching signal being used to detect an output voltage thereby to transmit a control signal to said switching element for the purpose of stabilizing said output voltage; the improvement comprising:

said primary winding, secondary winding, and auxiliary winding being formed on respective coil formation surfaces of a coil laminate as conductor patterns between a core hole and a border of said coil formation surface with said core hole being at a center of said conductor patterns; wherein said auxiliary winding is formed on said coil formation surface nearer to said border than to said core hole; wherein said transformer comprises a core having a center gap disposed in said core hole; wherein said coil laminate comprises two primary winding flat coil sections, each of which has a primary winding formed thereon; two secondary winding flat coil sections, each of which has a secondary winding formed thereon; and one auxiliary winding flat coil section on which an auxiliary winding is formed; wherein said auxiliary winding flat coil section forms an intermediate layer disposed between said two secondary winding flat coil sections; and wherein said two primary flat coil sections are on either side of said two secondary winding flat coil sections.

8. The converter of claim 7, wherein a magnetic core having a center gap is disposed in said core hole; and wherein said primary windings, said secondary windings and auxiliary winding are formed on respective coil formation surfaces of a coil laminate as conductor patterns positioned between said core hole and a border of said coil formation surface, with said auxiliary winding being formed in an area which is not of high magnetic flux density.

9. The converter of claim 7, further comprising said coil laminate having a plurality of pin terminals of copper based material connected to ends of said primary windings and said secondary windings, and inner layer patterns laminated with an insulating resin comprising said primary and secondary windings, heat sink means grounded to AC ground of a switching power supply and attached to said switching element and a rectifier circuit; and a winding pattern to transfer heat from said plurality of pin terminals to said heat sink means.

10. The converter of claim 9, wherein said heat sink means is disposed to be shared by said switching element and said rectifier circuit.

11. The converter of claim 9, wherein said heat sink means comprises a pair of heat sinks.

* * * * *